United States Patent
Coatney et al.

(10) Patent No.: US 8,380,824 B1
(45) Date of Patent: *Feb. 19, 2013

(54) SYSTEM AND METHOD OF IMPLEMENTING DISK OWNERSHIP IN NETWORKED STORAGE

(75) Inventors: Susan M. Coatney, Cupertino, CA (US); Alan L. Rowe, San Jose, CA (US); Radek Aster, Campbell, CA (US); Joydeep Sen Sarma, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/539,053

(22) Filed: Aug. 11, 2009

Related U.S. Application Data

(63) Continuation of application No. 10/027,457, filed on Dec. 21, 2001, now Pat. No. 7,650,412.

(51) Int. Cl.
*G06F 15/16* (2006.01)
(52) U.S. Cl. .................. 709/220; 709/223; 709/203
(58) Field of Classification Search .............. 709/220, 709/223, 203
See application file for complete search history.

(56) References Cited

U.S. PATENT DOCUMENTS

| | | | |
|---|---|---|---|
| 5,157,667 A | 10/1992 | Carusone et al. | |
| 5,163,131 A | 11/1992 | Row et al. | |
| 5,355,453 A | 10/1994 | Row et al. | |
| 5,485,579 A | 1/1996 | Hitz et al. | |
| 5,787,460 A | 7/1998 | Yashiro et al. | |
| 5,790,782 A | 8/1998 | Martinez et al. | |
| 5,802,366 A | 9/1998 | Row et al. | |
| 5,812,761 A | 9/1998 | Seki et al. | |
| 5,819,292 A | 10/1998 | Hitz et al. | |
| 5,835,940 A | 11/1998 | Yorimitsu et al. | |
| 5,872,906 A | 2/1999 | Morita et al. | |
| 5,894,588 A | 4/1999 | Kawashima et al. | |
| 5,931,918 A | 8/1999 | Row et al. | |
| 5,941,972 A | 8/1999 | Hoese et al. | |
| 5,954,822 A | 9/1999 | Yashiro et al. | |
| 5,963,962 A | 10/1999 | Hitz et al. | |
| 6,038,570 A | 3/2000 | Hitz et al. | |
| 6,044,444 A | 3/2000 | Ofek | |
| 6,065,037 A | 5/2000 | Hitz et al. | |
| 6,128,734 A | 10/2000 | Gross et al. | |
| 6,148,414 A | 11/2000 | Brown et al. | |
| 6,233,242 B1 | 5/2001 | Mayer et al. | |
| 6,247,099 B1 * | 6/2001 | Skazinski et al. | 711/141 |
| 6,317,844 B1 | 11/2001 | Kleiman | |
| 6,374,300 B2 | 4/2002 | Masters | |
| 6,425,035 B2 | 7/2002 | Hoese et al. | |

(Continued)

OTHER PUBLICATIONS

FTP directory/pub/lvm2/ at ftp://sources.redhat.com/pub/lvm2, no date.

(Continued)

*Primary Examiner* — Djenane Bayard
(74) *Attorney, Agent, or Firm* — Cesari and McKenna, LLP

(57) ABSTRACT

A method and apparatus for identifying ownership by a computer of a storage device connected to a computer network is described. A first ownership information is written into a selected sector of the storage device by a computer having ownership of the device as a first indicia of ownership. A second ownership information is written into a storage device label of the storage device by the computer having ownership as a second indicia of ownership, the storage device label visible to a plurality of computers connected to the computer network. In the event that at a future time the first indicia of ownership does not match the second indicia of ownership, the first indicia of ownership is taken as definitive of ownership of the storage device.

29 Claims, 7 Drawing Sheets

U.S. PATENT DOCUMENTS

| | | | |
|---|---|---|---|
| 6,470,382 B1 | 10/2002 | Wang et al. | |
| 6,513,097 B1 | 1/2003 | Beardsley et al. | |
| 6,622,163 B1 | 9/2003 | Tawill et al. | |
| 6,654,902 B1 | 11/2003 | Brunelle et al. | |
| 6,658,587 B1 | 12/2003 | Pramanick et al. | |
| 6,697,924 B2 | 2/2004 | Swank | |
| 6,708,265 B1 | 3/2004 | Black | |
| 6,718,361 B1 | 4/2004 | Basani et al. | |
| 6,732,289 B1 | 5/2004 | Talagala et al. | |
| 6,748,447 B1 | 6/2004 | Basani et al. | |
| 6,757,695 B1 | 6/2004 | Noveck et al. | |
| 6,760,862 B1 | 7/2004 | Schreiber et al. | |
| 6,804,703 B1 | 10/2004 | Allen et al. | |
| 6,836,832 B1 | 12/2004 | Klinkner et al. | |
| 6,851,005 B1 * | 2/2005 | Gnanasivam et al. | 710/220 |
| 6,883,065 B1 | 4/2005 | Pittelkow et al. | |
| 7,146,522 B1 | 12/2006 | Rowe et al. | |
| 7,159,080 B1 | 1/2007 | Coatney et al. | |
| 7,296,068 B1 | 11/2007 | Sarma et al. | |
| 2002/0078299 A1 | 6/2002 | Chiou et al. | |
| 2002/0083118 A1 | 6/2002 | Sim | |
| 2002/0099914 A1 | 7/2002 | Matsunami et al. | |
| 2002/0103975 A1 * | 8/2002 | Dawkins et al. | 711/133 |
| 2003/0005119 A1 | 1/2003 | Mercier et al. | |
| 2003/0033389 A1 | 2/2003 | Simpson | |
| 2003/0061491 A1 * | 3/2003 | Jaskiewicz et al. | 713/182 |
| 2003/0065782 A1 | 4/2003 | Nishanov et al. | |
| 2003/0093501 A1 | 5/2003 | Carlson et al. | |
| 2003/0097611 A1 | 5/2003 | Delaney et al. | |
| 2003/0179227 A1 * | 9/2003 | Ahmad et al. | 345/736 |
| 2003/0212863 A1 | 11/2003 | Ganguly et al. | |
| 2004/0230698 A1 | 11/2004 | Oeda et al. | |
| 2005/0022057 A1 * | 1/2005 | Takamoto et al. | 714/13 |

OTHER PUBLICATIONS

Vgexport.c, Sistina software, part of LVM2.2.01.15.tar, from ftp://sources.redhat.com/pub/lvm2, no date.

Vgimport.c, Sistana software, part of LVM2.2.01.15.tar, from ftp://sources.redhat.com/pub/lvm2, no date.

Vgcreate.c, Sistana software, part of LVM2.2.01.15.tar, from ftp://sources.redhat.com/pub/lvm2, no date.

Vgremove.c, Sistana software, part of LVM2.2.01.15.tar, from ftp://sources.redhat.com/pub/lvm2, no date.

Metadata.c, Sistana software, part of LVM2.2.01.15.tar, from ftp://sources.redhat.com/pub/lvm2, no date.

Metadata.h, Sistana software, part of LVM2.2.01.15.tar, from ftp://sources.redhat.com/pub/lvm2, no date.

Soltis S et al. "The Design and Performance of a Shared Disk File System for IRIX" NASA Goddard Space Flight Center Conference on Mass Storage and Technologies in Cooperation with the IEEE Symposium on Mass Storage Systems, Mar. 23, 1998, pp. 1-17, XP002194621.

Hu Yoshida: "LUN Security Considerations for Storage Area Networks" Hitachi Data Systems, 1999, pp. 1-7, XP002185193.

American National Standards Institute, Inc.; American National Standard for Information Technology; Fibre Channel—Physical and Signaling Interface (FC-PH); Nov. 14, 1994.

American National Standards Institute, Inc.; American National Standard for Information Technology—Fibre Channel Arbitrated Loop (FC-AL-2); Dec. 8, 1999.

SNIA Storage Networking Industry Association; Common Internet File System (CIFS), Version: CIFS—Spec. 0.9. Work Group in Progress.

Fibre Channel Generic Services—3 (FC-GS-3), Revision 6.0; NCITS Working Draft Proposed American National Standard for Information Technology; Nov. 24, 1999.

Draft Proposed American National Standard for Information Systems—SCSI-3 Primary Commands; Mar. 28, 1997.

New Identifier Formats Based on IEEE Registration; http://standards.ieee.org/regauth/oui/tutorials/fibreformat.html; Acccessed on Aug. 6, 2001.

* cited by examiner

|  | DISK 1 | DISK 2 | DISK 3 | |
|---|---|---|---|---|
| INITIAL STATE | <G, G> | <G, G> | <G, G> | |
| TP1 — STEP 1a | <U, G> | <U, G> | <U, G> | |
|  | <U, U> | <U, U> | <U, U> | INTERMEDIATE STATE |
| — STEP 1b | <G, U> | <G, U> | <G, U> | |
|  | <U, U> | <U, U> | <U, U> | INTERMEDIATE STATE |
| TP2 — STEP 2a | <U, R> | <U, R> | <U, R> | |
|  | <R, R> | <R, R> | <R, R> | COMPLETED STATE |
| — STEP 2b | <R, U> | <R, U> | <R, U> | |
|  | <R, R> | <R, R> | <R, R> | COMPLETED STATE |

FIG. 7

SYSTEM AND METHOD OF IMPLEMENTING DISK OWNERSHIP IN NETWORKED STORAGE

RELATED APPLICATIONS

This application is a continuation of U.S. patent application Ser. No. 10/027,457, filed on Dec. 21, 2001 by Susan M. Coatney et al., titled SYSTEM AND METHOD OF IMPLEMENTING DISK OWNERSHIP IN NETWORKED STORAGE, now U.S. Pat. No. 7,650,412, issued on Jan. 19, 2010.

This application is related to the following United States Patents:

U.S. Pat. No. 7,296,068 entitled SYSTEM AND METHOD FOE TRANSFERRING VOLUME OWNERSHIP IN NETWORKED STORAGE, by Sarma et al.

U.S. Pat. No. 7,159,080 entitled SYSTEM AND METHOD FOR STORING STORAGE OPERATING SYSTEM DATA IN SWITCH PORTS, by Susan M. Coatney et al.

U.S. Pat. No. 7,146,522 entitled SYSTEM AND METHOD FOR ALLOCATING SPARE DISKS IN NETWORKED STORAGE, by Alan L. Rowe et al.

FIELD OF THE INVENTION

The present invention relates to networked file servers, and more particularly to disk ownership in networked file servers.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, conversely, may be implemented as a specially formatted file in which information by other files and directories is stored.

A filer may be further configured to operate according to a client/server model of information delivery to thereby allow many clients to access files stored on a server. In this model, the client may comprise an application, such as a database application, executing on a computer that connects to the filer over a computer network. This computer network could be a point to point link, a shared local area network (LAN), a wide area network (WAN) or a virtual private network (VPN) implemented over a public network such as the Internet. Each client may request the services of the file system on the filer by issuing file system protocol messages (typically in the form of packets) to the filer over the network.

The disk storage typically implemented has one or more storage "volumes" comprised of a collection of physical storage disks, defining an overall logical arrangement of is storage space. Currently available filer implementations can serve a large number of discrete volumes (150 or more, for example). Each volume is generally associated with its own file system. The disks within a volume/file system are typically organized as one or more groups of Redundant Array of Independent (or Inexpensive) Disks (RAID). RAID implementations enhance the reliability and integrity of data storage through the redundant writing of data stripes across a given number of physical disks in the RAID group, and the appropriate caching of parity information with respect to the striped data. In the example of a WAFL based file system and process, a RAID 4 implementation is advantageously employed. This implementation specifically entails the striping of data across a group of disks, and separate parity caching within a selected disk of the RAID 4 group.

Each filer is deemed to "own" the disks that comprise the volumes serviced by that filer. This ownership means that the filer is responsible for servicing the data contained on those disks. Only the filer that owns a particular disk should be able to write data to that disk. This solo ownership helps to ensure data integrity and coherency. In prior storage system implementations, it is common for a filer to be connected to a local area network and a fibre channel loop. The fibre channel loop would have a plurality of disks attached thereto. As the filer would be the only device directly connected to the disks via the fibre channel loop, the filer owned the disks on that loop. However, a noted disadvantage of the prior art is the lack of scalability, as there is a limit to a number of disks that may be added to a single fibre channel loop. This limitation prevents a system administrator from having backup filers connected to the disks in the event of failure.

In another prior storage system implementation, two filers, which are utilized as a cluster, could be connected to a single disk drive through the use of the disk's A/B connector. The first filer would be connected to the A connection, while the second filer would be connected to the disk's B connection. In this implementation, the filer connected to a disk's A connection is deemed to own that disk. If the disks are arrayed in a disk shelf, all of the disks contained within that disk shelf share a common connection to the A and B connections. Thus, a filer connected to the A connection of a disk shelf is deemed to own all of the disks in that disk shelf. This lack of granularity (i.e. all disks on is a shelf are owned by a single filer) is a known disadvantage with this type of implementation.

FIG. 1 is a schematic block diagram of an exemplary network environment 100. The network 100 is based around a local area network (LAN) 102 interconnection. However, a wide area network (WAN), virtual private network (VPN), or a combination of LAN, WAN and VPM implementations can be established. For the purposes of this description the term LAN should be taken broadly to include any acceptable networking architecture. The LAN interconnects various clients based upon personal computers 104, servers 106 and a network cache 108. Also interconnected to the LAN may be a switch/router 110 that provides a gateway to the well-known Internet 112, thereby enabling various network devices to transmit and receive Internet based information, including e-mail, web content, and the like.

In this implementation, an exemplary filer 114 is connected to the LAN 102. This filer, described further below is a file server configured to control storage of, and access to, data in a set of interconnected storage volumes. The filer is connected to a fibre channel loop 118. A plurality of disks are also connected to this fibre channel loop. These disks comprise the volumes served by the filer. As described further below, each volume is typically organized to include one or more RAID groups of physical storage disks for increased data storage integrity and reliability. As noted above, in one implementation, each disk has an A/B connection. The disk's A connection could be connected to one fibre channel loop while the B connection is connected to a separate loop. This capability can be utilized to generate redundant data pathways to a disk.

Each of the devices attached to the LAN include an appropriate conventional network interface arrangement (not shown) for communicating over the LAN using desired communication protocol such as the well-known Transport Control Protocol/Internet Protocol (TCP/IP), User Datagram Protocol (UDP), Hypertext Transfer Protocol (HTTP), or Simple Network Management Protocol (SNMP).

One prior implementation of a storage system involves the use of switch zoning. Instead of the filer being directly connected to the fibre channel loop, the filer would be is connected to a fibre channel switch, which would then be connected to a plurality of fibre channel loops. Switch zoning is accomplished within the fibre channel switches by manually associating ports of the switch. This association with, and among, the ports would allow a filer connected to a port associated with a port connected to a fibre channel loop containing disks to "see" the disks within that loop. That is, the disks are visible to that port. However, a disadvantage of the switch zoning methodology was that a filer could only see what was within its zone. A zone is defined as all devices that are connected to ports associated with the port to which the filer was connected. Another noted disadvantage of this switch zoning method is that if zoning needs to be modified, an interruption of service occurs as the switches must be taken off-line to modify zoning. Any device attached to one particular zone can only be owned by another device within that zone. It is possible to have multiple filers within a single zone; however, ownership issues then arise as to the disks within that zone.

The need, thus, arises for a technique for a filer to determine which disks it owns other than through a hardware mechanism and zoning contained within a switch. This disk ownership in a networked storage methodology would permit easier scalability of networked storage solutions.

Accordingly, it is an object of the present invention to provide a system and method for implementing disk ownership in a networked storage arrangement.

SUMMARY OF THE INVENTION

This invention overcomes the disadvantages of the prior art by providing a system and method of implementing disk ownership by respective file servers without the need for direct physical connection or switch zoning within fibre channel (or other) switches. A two-part ownership identification system and method is defined. The first part of this ownership method is the writing of ownership information to a predetermined area of each disk. Within the system, this ownership information acts as the definitive ownership attribute. The second part of the ownership method is the setting of a SCSI-3 persistent reservation to allow only the disk owner to write to the disk. This use of a SCSI-3 persistent reservation allows other filers to read the ownership information from the disks. It is should be noted that other forms of persistent reservations can be used in accordance with the invention. For example, if a SCSI level 4 command set is generated that includes persistent reservations operating like those contained within the SCSI-3 command, these new reservations are expressly contemplated to be used in accordance with the invention.

By utilizing this ownership system and method, any number of file servers connected to a switching network can read from, but not write to, all of the disks connected to the switching network. In general, this novel ownership system and method enables any number of file servers to be connected to one or more switches organized as a switching fabric with each file server being able to read data from all of the disks connected to the switching fabric. Only the file server that presently owns a particular disk can write to a given disk.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 7 is a block diagram of the various steps of the transfer process in accordance with an embodiment of this invention.

DETAILED DESCRIPTION OF AN ILLUSTRATIVE EMBODIMENT

A. Network Environment

Figure 1:
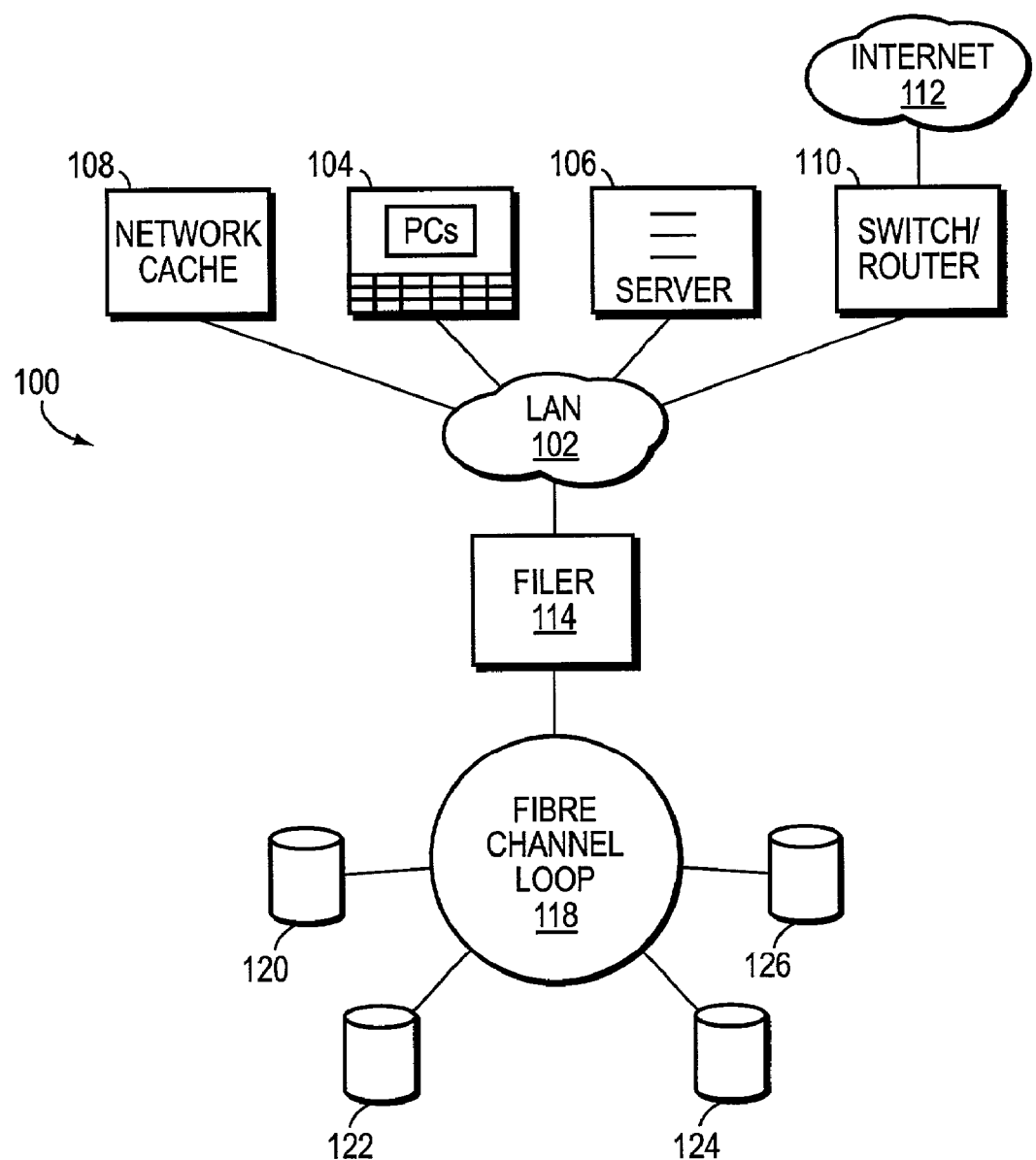
FIG. 1, already described, is a schematic block diagram of a network environment showing the prior art of a filer directly connected to fibre channel loop.
Figure 2:
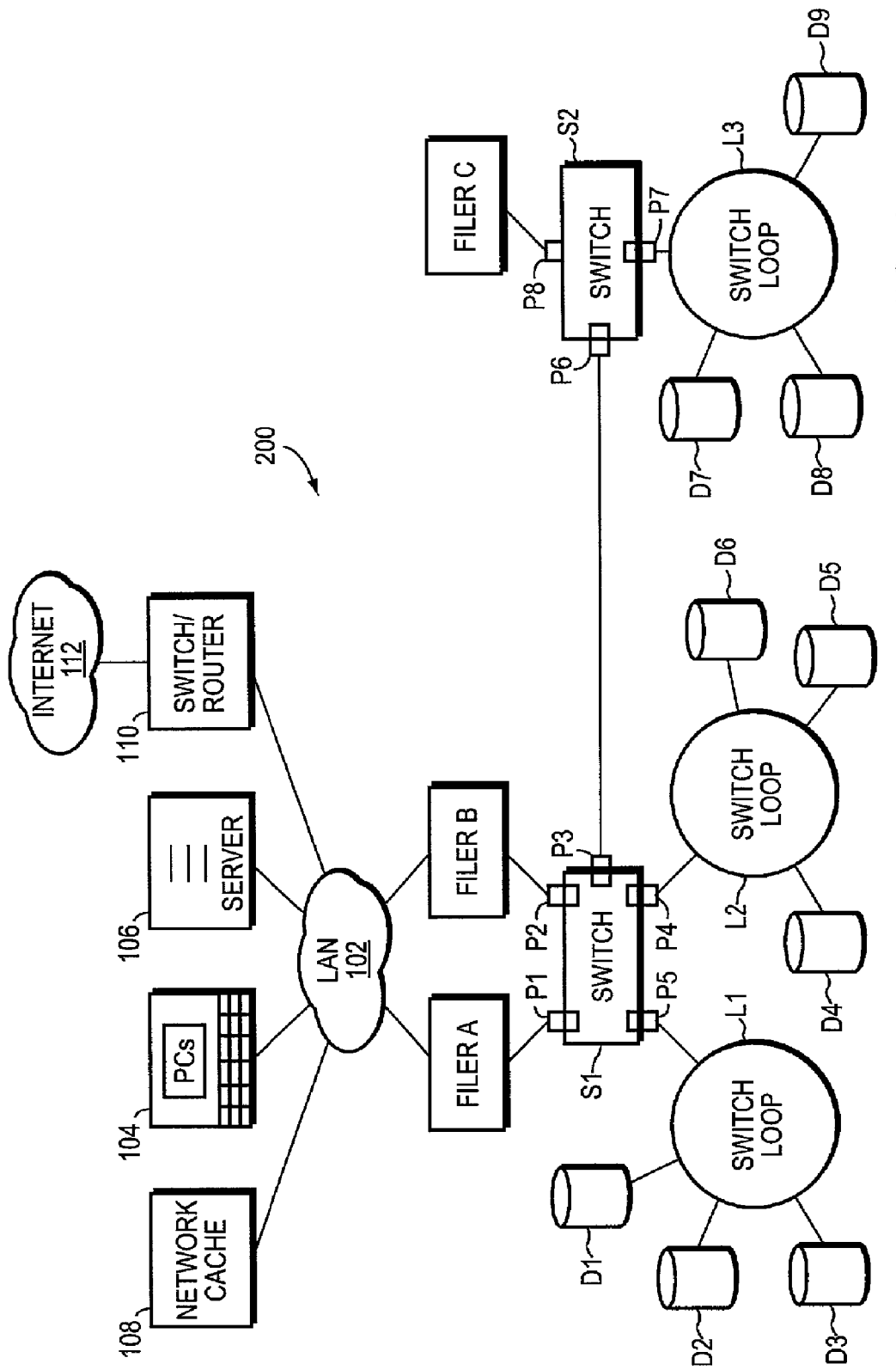
FIG. 2 is a schematic block diagram of a network environment including various network devices including exemplary file servers and associated volumes.

FIG. 2 is a schematic block diagram of an exemplary network environment 200 in which the principles of the present invention are implemented. This network is based around a LAN 102 and includes a plurality of clients such as a network cache 108, personal computers 104, servers 106, and a switch/router 110 for connection to the well-known Internet.

Exemplary file servers, filers A and B, are also connected to the LAN. Filers A and B are also connected to a switch S1. The switch S1 is preferably a fibre channel switch containing a plurality of ports P1, P2, P3, P4 and P5. One example of a fibre channel switch is the Silkworm 6400™ available from Brocade Communications Systems, Inc. of San Jose, Calif. It should be noted that it is expressly contemplated that other forms of switches may be utilized in accordance with the present invention.

Attached to the various ports of switch S1 include fibre channel loops L1 and L2 and a second switch S2. Attached to a port P7 of switch S2 is a third fibre channel loop L3. Each of the fibre channel loops has a plurality of disks attached thereto. In an illustrative configuration, ports P3 and P6 can also be linked to enable switches to communicate as if they are part of a single switching fabric. It should be noted that each port of a switch is assumed to be identical. As such, fibre channel loops, filers or other switches can be connected to any port. The port numbers given here are for illustrative purposes only.

It is preferred to have only one filer own an individual disk. This singular ownership prevents conflicting data writes and helps to ensure data integrity. Switch zoning permits individual ports of a switch to be associated into a zone. As an illustrative example, ports P1 and P5 of switch S1 could be associated into a single zone. Similarly, ports P2 and P4 could be zoned together. This association is made within the individual switch using appropriate switch control hardware and software. This switch zoning creates, in effect, a "hard" partition between individual zones. Note also that the number of switches and ports and their configuration is highly variable. A device attached to a switch can only see and access other devices within the same zone. To change zoning, for example, to move the fibre channel loop attached to port P4 from one zone to another, typically requires taking the entire file server off-line for a period of time.

To overcome the disadvantages of the prior art, ownership information is written to each physical disk. This ownership information permits multiple filers and fibre channel loops to be interconnected, with each filer being able to see all disks connected to the switching network. By "see" it is meant that the filer can recognize the disks present and can read data from the disks. Any filer is then able to read data from any disk, but only the filer that owns a disk may write data to it. This ownership information consists of two ownership attributes. The first attribute is ownership information written to a predetermined area of each disk. This predetermined area is called sector S. This sector S can be any known and constant location on each of the disks. In one embodiment, sector S is sector zero of each of the disks.

The second attribute is Small Computer System Interface (SCSI) level 3 persistent reservations. These SCSI-3 reservations are described in *SCSI Primary Commands—3*, by Committee T10 of the National Committee for Information Technology Standards, which is incorporated fully herein by reference. By using SCSI-3 reservations, non-owning file servers are prevented from writing to a disk; however, the non-owning file servers can still read the ownership information from a pre-determined location on the disk. In a preferred embodiment, the ownership information stored in sector S acts as the definitive ownership data. In this preferred embodiment, if the SCSI-3 reservations do not match the sector S data, the sector S ownership is used.

B. File Servers

Figure 3:
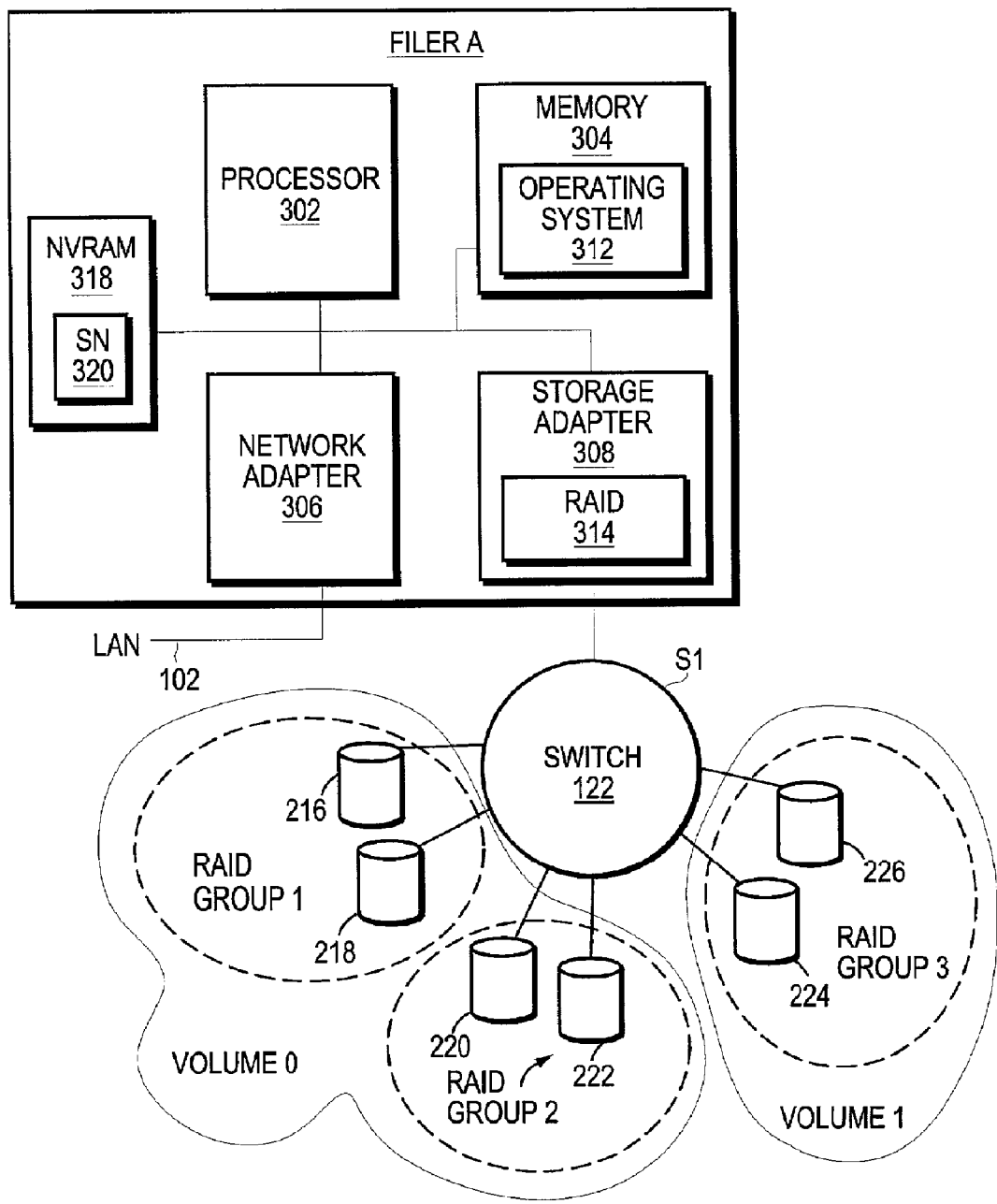
FIG. 3 is a schematic block diagram of an exemplary storage appliance in accordance with FIG. 2.

FIG. 3 is a more-detailed schematic block diagram of illustrative Filer A that is advantageously used with this invention. Other filers can have similar construction, including, for example, Filer B. By way of background, a file server, embodied by a filer, is a computer that provides file service relating to the organization of information on storage devices, such as disks. In addition, it will be understood to those skilled in the art that the inventive technique described herein may apply to any type of special-purpose computer (e.g., server) or general-purpose computer, including a standalone computer, embodied as a file server. Moreover, the teachings of this invention can be adapted to a variety of file server architectures including, but not limited to, a network-attached storage environment, a storage area network and disk assembly directly-attached to a client/host computer. The term "file server" should therefore be taken broadly to include such arrangements.

The file server comprises a processor 302, a memory 304, a network adapter 306 and a storage adapter 308 interconnected by a system bus 310. The file server also includes a storage operating system 312 that implements a file system to logically organize the information as a hierarchical structure of directories and files on the disk. Additionally, a non-volatile RAM (NVRAM) 318 is also connected to the system bus. The NVRAM is used for various filer backup functions according to this embodiment. In addition, within the NVRAM is contained a unique serial number 320. This serial number 320 is preferably generated during the manufacturing of the file server; however, it is contemplated that other forms of generating the serial number may be used, including, but not limited to using a general purpose computer's microprocessor identification number, the file server's media access code (MAC) address, etc.

In the illustrative embodiment, the memory 304 may have storage locations that are addressable by the processor for storing software program code or data structures associated with the present invention. The processor and adapters may, in turn, comprise processing elements and/or logic circuitry configured to execute the software code and manipulate the data structures. The storage operating system 312, portions of which are is typically resident in memory and executed by the processing elements, functionally organize a file server by inter-alia invoking storage operations in support of a file service implemented by the file server. It will be apparent by those skilled in the art that other processing and memory implementations, including various computer readable media may be used for storing and executing program instructions pertaining to the inventive technique described herein.

The network adapter 306 comprises the mechanical, electrical and signaling circuitry needed to connect the file server to a client over the computer network, which as described generally above, can comprise a point-to-point connection or a shared medium such as a LAN. A client can be a general-purpose computer configured to execute applications including file system protocols, such as the Network File System (NFS) or the Common Internet File System (CIFS) protocol. Moreover, the client can interact with the file server in accordance with the client/server model of information delivery. The storage adapter cooperates with the storage operating system 312 executing in the file server to access information requested by the client. The information may be stored in a number of storage volumes (Volume 0 and Volume 1) each constructed from an array of physical disks that are organized as RAID groups (RAID GROUPs 1, 2 and 3). The RAID groups include independent physical disks including those storing a striped data and those storing separate parity data. In accordance with a preferred embodiment RAID 4 is used. However, other configurations (e.g., RAID 5) are also contemplated.

The storage adapter 308 includes input/output interface circuitry that couples to the disks over an I/O interconnect arrangement such as a conventional high-speed/high-performance fibre channel serial link topology. The information is retrieved by the storage adapter, and if necessary, processed by the processor (or the adapter itself) prior to being forwarded over the system bus to the network adapter, where the information is formatted into a packet and returned to the client.

To facilitate access to the disks, the storage operating system implements a file system that logically organizes the information as a hierarchical structure of directories in files on the disks. Each on-disk file may be implemented as a set of disk blocks configured to store information such as text, whereas the directory may be implemented as a is specially formatted file in which other files and directories are stored. In the illustrative embodiment described herein, the storage operating system associated with each volume is preferably the NetApp® Data ONTAP storage operating system available from Network Appliance Inc. of Sunnyvale, Calif. that implements a Write Anywhere File Layout (WAFL) file system. The preferred storage operating system for the exemplary file server is now described briefly. However, it is expressly contemplated that the principles of this invention can be implemented using a variety of alternate storage operating system architectures.

The host adapter 316, which is connected to the storage adapter of the file server, provides the file server with a unique world wide name, described further below.

C. Storage Operating System and Disk Ownership

Figure 4:
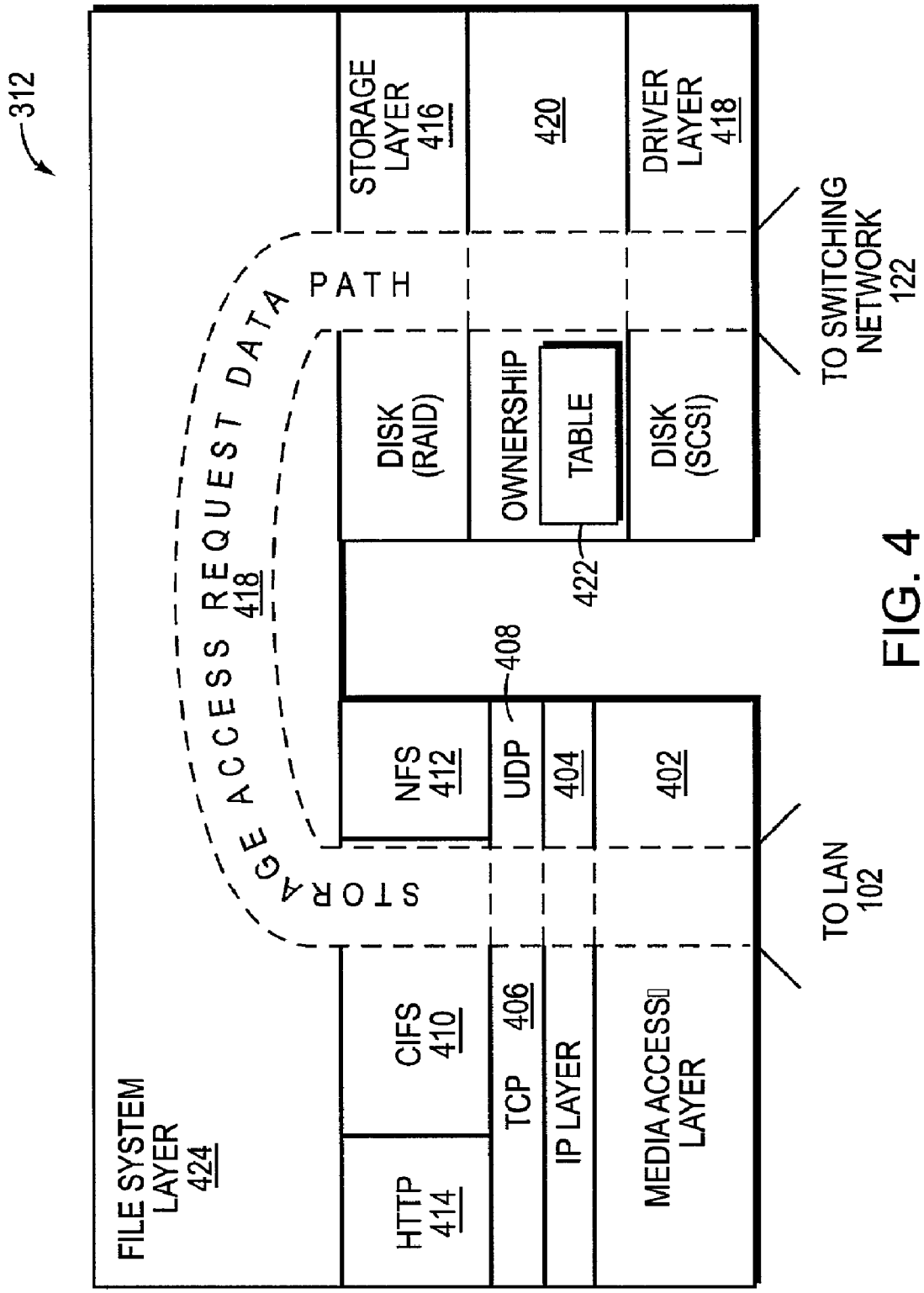
FIG. 4 is a schematic block diagram of a storage operating system for use with the exemplary file server of FIG. 3 according to an embodiment of this invention.

As shown in FIG. 4, the storage operating system 312 comprises a series of software layers including a media access layer 402 of network drivers (e.g., an Ethernet driver). The storage operating system further includes network protocol layers such as the Internet Protocol (IP) layer 404 and its Transport Control Protocol (TCP) layer 406 and a User Datagram Protocol (UDP) layer 408. A file system protocol layer provides multi-protocol data access and, to that end, includes support from the CIFS protocol 410, the Network File System (NFS) protocol 412 and the Hypertext Transfer Protocol (HTTP) protocol 414.

In addition, the storage operating system 312 includes a disk storage layer 416 that implements a disk storage protocol such as a RAID protocol, and a disk driver layer 418 that implements a disk access protocol such as e.g., a Small Computer System Interface (SCSI) protocol. Included within the disk storage layer 416 is a disk ownership layer 420, which manages the ownership of the disks to their related volumes. Notably, the disk ownership layer includes program instructions for writing the proper ownership information to sector S and to the SCSI reservation tags.

As used herein, the term "storage operating system" generally refers to the computer-executable code operable on a storage system that implements file system semantics (such as the above-referenced WAFL) and manages data access. In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Bridging the disk software layers, with the network and file system protocol layers, is a file system layer 424 of the storage operating system. Generally, the file system layer 424 implements the file system having an on-disk file format representation that is a block based. The file system generated operations to load/retrieve the requested data of volumes if it not resident "in core," i.e., in the file server's memory. If the information is not in memory, the file system layer indexes into the mode file using the mode number to access an appropriate entry and retrieve a logical block number. The file system layer then passes the logical volume block number to the disk storage/RAID layer, which maps out logical number to a disk block number and sends the later to an appropriate driver of a disk driver layer. The disk driver accesses the disk block number from volumes and loads the requested data into memory for processing by the file server. Upon completion of the request, the file server and storage operating system return a reply, e.g., a conventional acknowledgement packet defined by the CIFS specification, to the client over the network. It should be noted that the software "path" 418 through the storage operating system layers described above needed to perform data storage access for the client received the file server may ultimately be implemented in hardware, software or a combination of hardware and software (firmware, for example).

Figure 5:
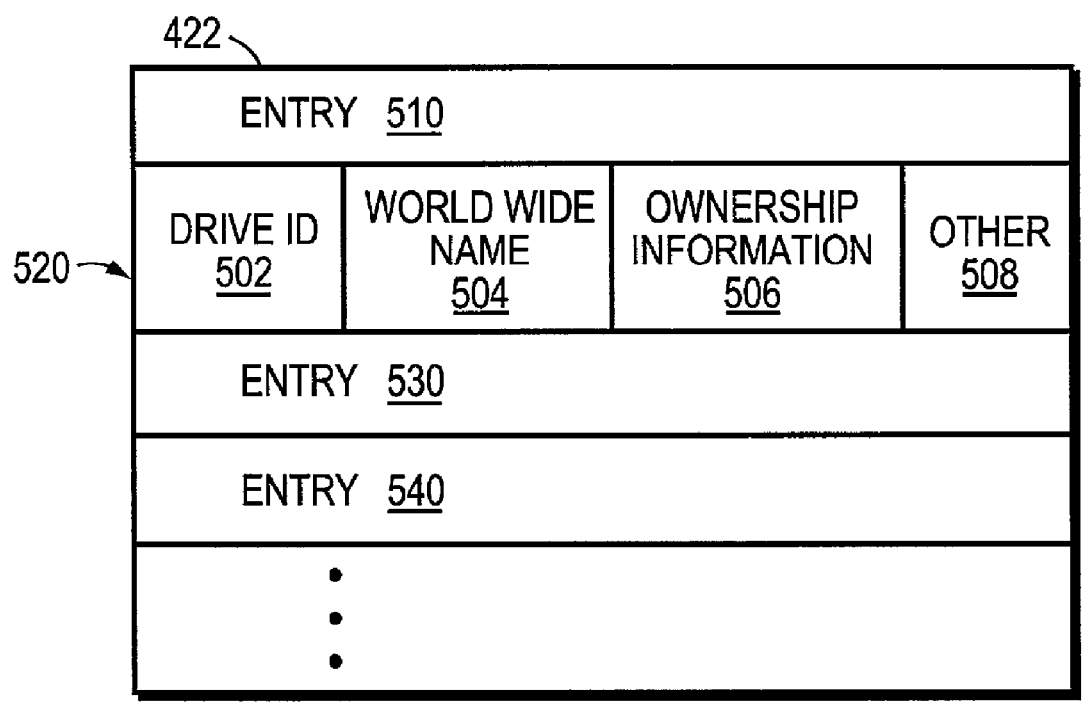
FIG. 5 is a block diagram of an ownership table maintained by the ownership layer of the storage operating system of FIG. 4 in accordance with an embodiment of this invention.

Included within the ownership layer 420 is a disk table 422 containing disk ownership information as shown in FIG. 5. This disk table 422 is generated at boot-up of the file server, and is updated by the various components of the storage operating system to reflect changes in ownership of disks.

FIG. 5 is an illustrative example of the disk table 422 maintained by the ownership layer of the storage operating system. The table comprises a plurality of entries 510, 520, 530 and 540, one for each disk accessible by the subject file server. Illustrative entry 520 includes fields for the drive identification 502, world wide name 504, ownership information 506 and other information 508. The world wide name is a 64-byte identification number which is unique for every item attached to a fibre channel network. World wide names are described in *ANSI X3*.230-1995, *Fibre Channel Physical and Signaling Interface (FC-PH)* and Bob Snively, *New Identifier Formats Based on IEEE* Registration *X3T*11/96-467, revision 2, which are hereby incorporated by reference. The world wide name is generally inserted into disk drives during their manufacturing process. For file servers, the world wide name is normally generated by adding additional data bits to the file server serial number contained within the NVRAM. However, it is expressly contemplated that other means for generating a world wide name (or other appropriate standardized unique naming scheme) for file servers are possible, including, but not limited to adding the manufacturer's name to a processor identification, etc.

Figure 6:
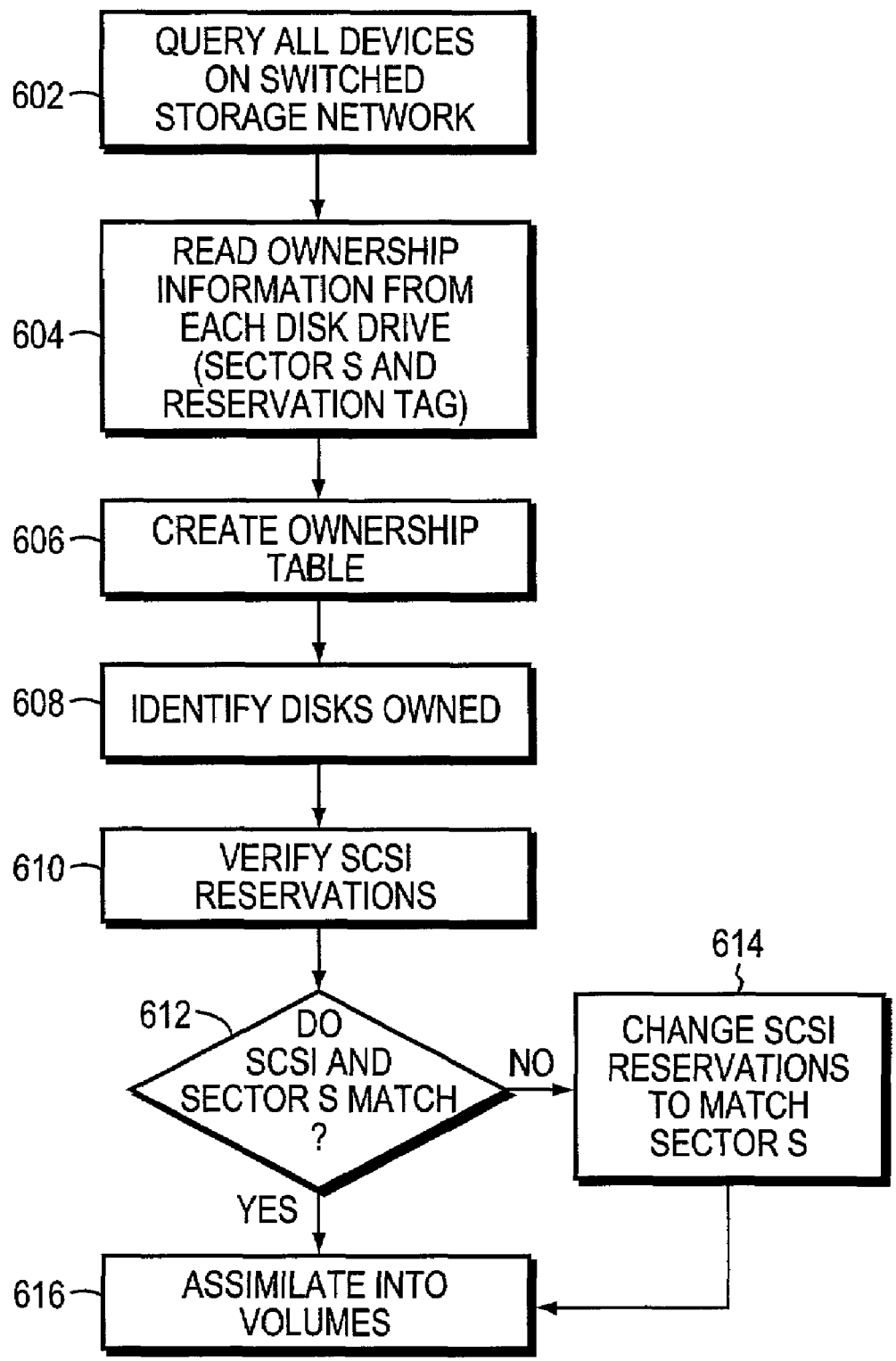
FIG. 6 is a flow chart detailing the steps performed by the storage operating system upon boot up to obtain ownership information of all disks connected to fibre channel switches connected to the individual filer.

FIG. 6 is a flow chart detailing the steps that the various layers of the storage operating system of a file server undergo upon initialization to generate the initial disk ownership table. In step 602, the I/O services and disk driver layer queries all devices attached to the switching network. This query requests information as to the nature of the device attached. Upon the completion of the query, in step 604, the ownership layer 420 (FIG. 4) instructs the disk driver layer 418 to read the ownership information from each disk drive. The disk driver layer reads the sector S ownership information from each physical disk drive identified in the previous step. The ownership layer then creates the ownership table 422 in step 606.

The ownership layer 420 extracts from the disk ownership table 422 the identification of all disks that are owned by this subject file server. The ownership layer then, in step 610, verifies the SCSI reservations on each disk that is owned by that file server by reading the ownership information stored in sector S. If the SCSI reservations and sector S information do not match, the ownership layer will, in step 614, change the SCSI reservation to match the sector S ownership information. Once the SCSI reservations and sector S ownership information match for all the disks identified as being owned by the file server the ownership layer will then pass the information to the disk storage layer for that layer to configure the individual disks into the appropriate RAID groups and volumes for the file server.

The disk ownership layer also provides an application program interface (API) which is accessible by various other layers of the storage operating system. For example, the disk migration layer often undertakes to access the disk table to determine current disk ownership. The disk migration layer is described in U.S. Pat. No. 7,296,068 entitled SYSTEM AND METHOD FOR TRANSFERRING VOLUME OWNERSHIP IN NETWORKED STORAGE by Joydeep Sen Sarma et al., which is hereby incorporated by reference. Additionally, a preselection process, which is part of an administrative graphical user interface (GUI), utilizes the API to access information in the disk ownership table. This preselection process is described in U.S. Pat. No. 6,836,832 titled METHOD FOR PRESELECTING CANDIDATE DISKS BASED ON VALIDITY FOR VOLUME by Steven Klinkner, which is hereby incorporated by reference.

Additionally, the disk ownership layer continues to update the disk ownership table during the operation of the file server. Thus, when the disk topology changes, the switches involved report the changes to connected file servers. The file servers then update their respective disk ownership tables by executing the method described above.

FIG. 7 shows the steps of the transfer process in accordance with this invention. In this example, Disks 1, 2 and 3 are currently owned by the Green file server and are to be transferred to the Red file server. The initial state shows disks 1, 2 and 3 owned by the green file server. Both the sector S data and the SCSI-3 reservations are labeled as green (i.e. <G,G>). Step one of the transfer process (TP1) is to convert the disks from the initial state into a completely un-owned (U) stage (<U,U>). There are two variants of step one. In step 1*a*, the sector S information is modified to an un-owned state (<U,G>) and then the SCSI-3 reservations are changed to the un-owned state, resulting in <U,U>. Step 1*b* involves first changing the SCSI-3 reservations to an un-owned state (<G,U>). The second part of step 1*b* is changing the sector S data to an un-owned state. At the end of step 1*a* or 1*b* the disks will be completely un-owned, i.e. <U,U> and at the intermediate step.

Step 2 of a transfer process (TP2) involves modifying the disks from the intermediate state <U,U> to a state signifying their ownership by the red file server <R,R>. There are also two alternate methods of performing step 2 of the transfer process. Step 2*a* involves first writing the SCSI reservation data to the disks (<U,R>) and then writing the sector S data. Step 2*b* involves first writing the sector S data (<R,U>) and then writing the SCSI reservation data to the disks. At the end of either step 2*a* or 2*b*, the result will be a disk completely owned by the red file server (<R,R>). When the disks are in a <R,R> state the transfer process has completed the transfer of ownership.

The foregoing has been a detailed description of the invention. Various modification and additions can be made without departing from the spirit and scope of this invention. Furthermore, it is expressly contemplated that the processes shown and described according to this invention can be implemented as software, consisting of a computer-readable medium including program instructions executing on a computer, as hardware or firmware using state machines and the alike, or as a combination of hardware, software, and firmware. Additionally, it is expressly contemplated that other devices connected to a network can have ownership of a disk in a network environment. Accordingly, this description is meant to be taken only by way of example and not to otherwise limit the scope of this invention.

What is claimed is:

1. A method for implementing ownership of a storage device connected to a network, comprising:
    writing a first attribute of ownership information of the storage device associated with a first computer, having a processor and a memory, to a first location on the storage device, wherein the first computer is coupled to the storage device over the network;
    writing a second attribute of ownership information of the storage device associated with a second computer to a second location on the storage device, wherein the second computer is coupled to the first computer over the network;
    determining whether the first attribute matches the second attribute by the storage operating system; and
    in response to a mismatch, using the first attribute as definitive ownership information of the storage device based on storage of the first attribute at the first location on the storage device, wherein the definitive ownership of the storage device by the first computer allows the first computer to write data to the storage device and the second is computer is prevented from writing data to the storage device.

2. The method as in claim 1, further comprising:
    changing the second attribute to match the first attribute to accept the first attribute of ownership information as definitive.

3. The method as in claim 2, further comprising:
    reporting the change to at least one computer connected to the network.

4. The method as in claim 1, further comprising:
    owning the storage device by the first computer;
    permitting the second computer operatively connected to the network to read the storage device; and
    permitting only the first computer to write to the storage device.

5. The method as in claim 1, wherein the storage device comprises a disk.

6. The method as in claim 1, further comprising:
    including the storage device in a plurality of storage devices organized as redundant array of inexpensive disks (RAID).

7. The method as in claim 1, wherein the storage device comprises a computer readable media.

8. The method as in claim 1, wherein the first location is a sector S area on the storage device.

9. The method as in claim 8, wherein the second location is a Small Computer System Interface (SCSI) reservation on the storage device.

10. The method as in claim 1, wherein the first attribute comprises a current ownership information of the storage device.

11. The method as in claim 1, wherein the second attribute comprises a persistent reservation.

12. The method as in claim 11, wherein the persistent reservation comprises a Small Computer System Interface (SCSI) reservation.

13. The method as in claim 1, further comprising:
    assimilating the storage device into a volume in response to a match between the first attribute and the second attribute.

14. The method as in claim 1, further comprising:
    creating an ownership table with the first attribute and the second attribute.

15. A non-transitory computer-readable medium containing program instructions executed by a processor, comprising:
    program instructions that write a first attribute of ownership information of a storage device associated with a first computer to a first location on the storage device coupled to the first computer over a network;
    program instructions that write a second attribute of ownership information of the storage device associated with a second computer to a second location on the storage device coupled to the second computer over the network;
    program instructions that determine whether the first attribute matches the second attribute; and
    program instructions that, in response to a mismatch, use the first attribute as definitive ownership information of the storage device based on storage of the first attribute at the first location on the storage device, wherein the definitive ownership of the storage device by the first computer allows the first computer to write data to the is storage device and the second computer is prevented from writing data to the storage device.

16. An apparatus, comprising:
    a storage device coupled to a plurality of computers over a network, wherein the storage device includes;
        a first location to maintain a first attribute of ownership of the storage device associated with a first computer of the plurality of computers;
        a second location to maintain a second attribute of ownership of the storage device associated with a second computer of the plurality of computer;

a processor configured to determine whether the first attribute and the second attribute match; and the processor further configured to, in response to a mismatch, determine that the first computer associated with the first attribute is a definitive owner of the storage device, wherein the first computer is the only computer that can write to the storage device.

17. The apparatus as in claim 16, wherein the processor is further configured to change the second attribute to match the first attribute.

18. The apparatus as in claim 16, further comprising a switch configured to report the change to at least one computer connected to the network.

19. The apparatus as in claim 16, wherein the second computer is configured to read the storage device and is prevented from writing to the storage device.

20. The apparatus as in claim 16, wherein the storage device comprises a disk.

21. The apparatus as in claim 16, wherein the storage device is included in a plurality of storage devices arranged as a redundant array of inexpensive disks (RAID).

22. The apparatus as in claim 16, wherein the storage device comprises a computer readable media.

23. The apparatus as in claim 16, wherein the first location is a sector S area on the storage device.

24. The apparatus as in claim 23, wherein the second location is a Small Computer System Interface (SCSI) reservation on the storage device.

25. The apparatus as in claim 16, wherein the first attribute comprises a current ownership information of the storage device.

26. The apparatus as in claim 16, wherein the second attribute comprises a persistent reservation.

27. The apparatus as in claim 26, wherein the persistent reservation comprises a Small Computer System Interface (SCSI) reservation.

28. The apparatus as in claim 16, wherein the storage device is assimilated into a volume in response to a match between the first attribute and the second attribute.

29. The apparatus as in claim 16, wherein an ownership table is configured to maintain the first attribute and the second attribute.

* * * * *

UNITED STATES PATENT AND TRADEMARK OFFICE
CERTIFICATE OF CORRECTION

PATENT NO. : 8,380,824 B1
APPLICATION NO. : 12/539053
DATED : February 19, 2013
INVENTOR(S) : Susan M. Coatney et al.

Page 1 of 2

It is certified that error appears in the above-identified patent and that said Letters Patent is hereby corrected as shown below:

In the Specification

In col. 1, line 15 should read:
~~FOE~~ FOR TRANSFERRING VOLUME OWNERSHIP IN

In col. 1, line 55 should read:
age disks, defining an overall logical arrangement of ~~is~~ stor- In col. 2, line 31 should read:
larity (i.e. all disks on ~~is~~ a shelf are owned by a single filer) is In col. 3, line 3 should read:
nected to the fibre channel loop, the filer would be ~~is~~ con- In col. 6, line 5 should read:
which are ~~is~~ typically resident in memory and executed by the In col. 6, line 48 should read:
whereas the directory may be implemented as a ~~is~~ specially In col. 7, line 37 should read:
into the ~~mode~~ inode file using the ~~mode~~ inode number to access an appro- In the Claims In col. 9, line 61:
puter to write data to the storage device and the second ~~is~~

Signed and Sealed this
Fourth Day of June, 2013

Teresa Stanek Rea
*Acting Director of the United States Patent and Trademark Office*

CERTIFICATE OF CORRECTION (continued)
U.S. Pat. No. 8,380,824 B1

In col. 10, line 56:
computer allows the first computer to write data to the ~~is~~